US006767218B2

(12) United States Patent
Marmaropoulos

(10) Patent No.: US 6,767,218 B2
(45) Date of Patent: Jul. 27, 2004

(54) QUICK RELEASE MECHANICAL CONNECTOR INCLUDING PROTECTED ELECTRICAL CONNECTOR

(75) Inventor: George Marmaropoulos, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/118,869

(22) Filed: Apr. 9, 2002

(65) Prior Publication Data

US 2002/0146917 A1 Oct. 10, 2002

Related U.S. Application Data

(60) Provisional application No. 60/282,747, filed on Apr. 10, 2001.

(51) Int. Cl.[7] ........................ H01R 33/00; H01R 13/52; B60R 22/00; B60R 22/48

(52) U.S. Cl. ....................... 439/37; 280/801.1; 439/521

(58) Field of Search .......................... 439/37, 352, 153, 439/521, 587; 280/801.1

(56) References Cited

U.S. PATENT DOCUMENTS 3,192,499 A * 6/1965 West .......................... 439/354
4,109,989 A * 8/1978 Snyder et al. ............. 439/140
4,526,431 A * 7/1985 Kasukawa .................. 439/153
4,907,984 A * 3/1990 Keller ........................ 439/369
4,917,625 A * 4/1990 Haile ......................... 439/358
4,998,891 A * 3/1991 Bresko ....................... 439/369
5,069,634 A * 12/1991 Chiarolanzio ............... 439/353
6,024,382 A 2/2000 Baumann ................. 280/801.1

* cited by examiner

*Primary Examiner*—Chandrika Prasad
(74) *Attorney, Agent, or Firm*—Aaron Waxler

(57) ABSTRACT

A quick release buckle for securing both an electrical connection and a mechanical coupling includes a multiple pin male portion of an electrical connector. The buckle also includes means for receiving the male portion of an electrical connector to form an electrical connection, a first protective housing containing one of the multiple pin male portion and the means for receiving the multiple pin male portion and capable of insertion, and a second protective housing containing one of the means for receiving the male portion and the multiple pin male portion. The second protective housing is capable of receiving the first protective housing to form a mechanical coupling. In addition, the first and second protective housings include at least one quick-release mechanism for fastening and decoupling the buckle.

10 Claims, 3 Drawing Sheets

QUICK RELEASE MECHANICAL CONNECTOR INCLUDING PROTECTED ELECTRICAL CONNECTOR

CROSS REFERENCE TO RELATED APPLICATION

This application claims the benefit of U.S. Provisional Application Serial No. 60/282,747, filed Apr. 10, 2001, the teachings of which are incorporated herein by reference.

FIELD OF THE INVENTION

The present invention relates to electrical and mechanical connections and, in particular, to quick release buckles used in wearable electronics to connect electrical devices to garments.

BACKGROUND OF THE INVENTION

Electronic devices such as MP3 players and cellular telephones are becoming increasingly small and portable. The demand for increased portability and convenience drives a major trend in the consumer electronics marketplace toward wearable electronic devices that can be attached to garments. These "wearable electronic devices" require electrical connection both with other devices (i.e., headphones connected to an MP3 player) as well as with circuits that form part of a garment itself (i.e., conductive fibers, etc.). Wearable electronic devices also require mechanically strong connections because the electronic devices need to stay attached to a wearer's garment as the wearer moves (i.e., a portable MP3 player attached to a jogger's shorts). Further, wearable electronic devices also demand a level of fashion not generally associated with conventional electronic devices.

Currently, there are a number of electrical connectors, similar to those used in mobile telephone chargers, which provide electrical connectivity and some amount of mechanical strength. However, these devices lack the requisite mechanical strength, design, and user interface required by the fashion/garment industry.

Further, within the fashion/garment industry, there are many varieties of quick-release buckles which allow for the mechanical connection of two or more items. An example of such quick-release buckles is a rucksack with straps that have buckle elements attached. When the buckle elements are connected they form a friction coupling and can be decoupled with relative ease, usually by depressing a portion of one of the buckle elements such that it slides through an opening in its counterpart. However, these buckles currently do not have the capacity for forming electrical connections.

SUMMARY OF THE INVENTION

According to the invention, in one aspect, a buckle for securing both an electrical connection and a mechanical coupling includes a multiple pin male portion of an electrical connector. The buckle also includes means for receiving the male portion of an electrical connector to form an electrical connection, a first protective housing containing one of the multiple pin male portion and the means for receiving the multiple pin male portion and capable of insertion, and a second protective housing containing one of the means for receiving the male portion and the multiple pin male portion. The second protective housing is capable of receiving the first protective housing to form a mechanical coupling. In addition, the first and second protective housings include at least one quick-release mechanism for fastening and decoupling the buckle.

In one embodiment of the invention, the mechanical coupling of the buckle includes at least one flexible portion of one of the first and second protective housings which depresses upon insertion and substantially returns to its original position upon alignment with at least one opening in the other of the first and second protective housings, and the flexible portion and the opening generate the coupling.

In one embodiment of the invention, the first and second protective housings include a sealing means for forming a protective seal around the multiple pin male portion and the means for receiving the multiple pin male portion when connected. In another embodiment, the sealing means is a sealing cup.

In one embodiment of the invention, at least one of the first and second protective housings include a sealing means for forming a protective seal around at least one of the multiple pin male portion and the means for receiving the multiple pin male portion when not connected. In another embodiment the sealing means around either the multiple pin male portion, the means for receiving the multiple pin male portion, or both the multiple pin male portion and the means for receiving the multiple pin male portion is a sealing cup. In another embodiment, the sealing means can be displaced such that the multiple pin male portion and the means for receiving the multiple pin male portion can form an electrical connection upon insertion. In another embodiment, the sealing means can be displaced such that it forms a protective seal around the multiple pin male portion and the means for receiving the multiple pin male portion when connected.

In one embodiment, at least one of the first and second protective housings is attached to a garment. In another embodiment, at least one of the multiple pin male portion and the means for receiving the male portion is electrically connected to the garment.

In one embodiment, at least one of the first and second protective housings is attached to an electrical device. In another embodiment, at least one of the multiple pin male portion and the means for receiving the male portion is electrically connected to the electrical device.

The invention provides many advantages, some of which are elucidated with reference to the embodiments below.

DETAILED DESCRIPTION OF THE PRIMARY EMBODIMENT

The proposed buckle secures both an electrical connection and a mechanical coupling.

Figure 1:
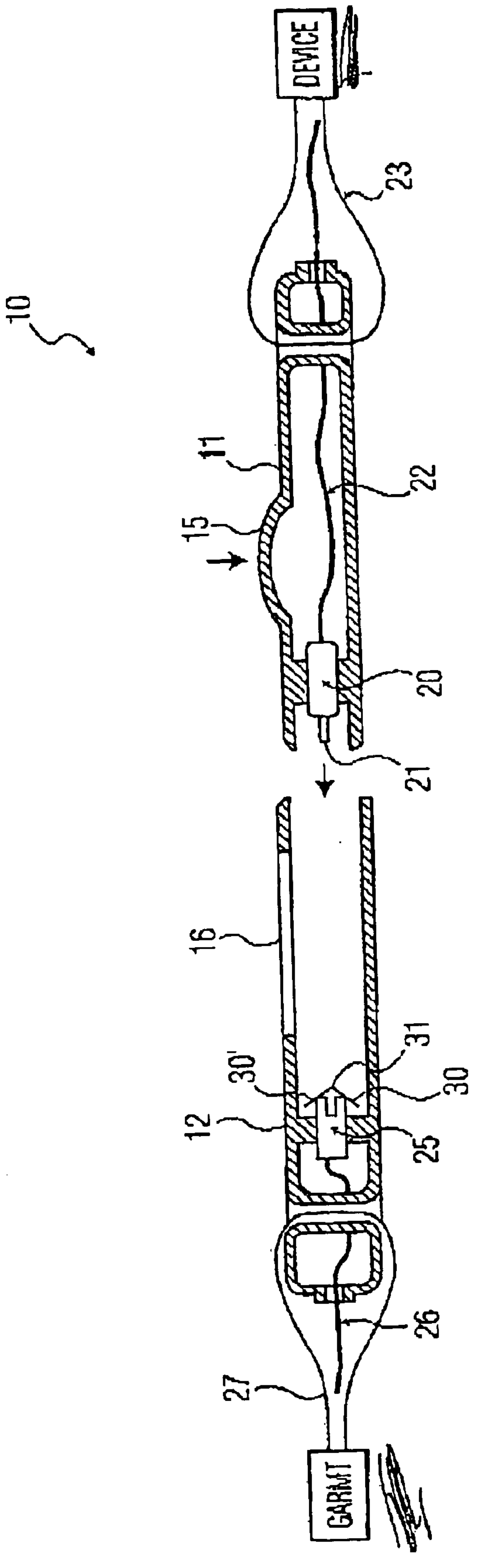
FIG. 1 depicts a side view of a quick-release buckle connector for forming both an electrical connection and a mechanical coupling.
Figure 2:
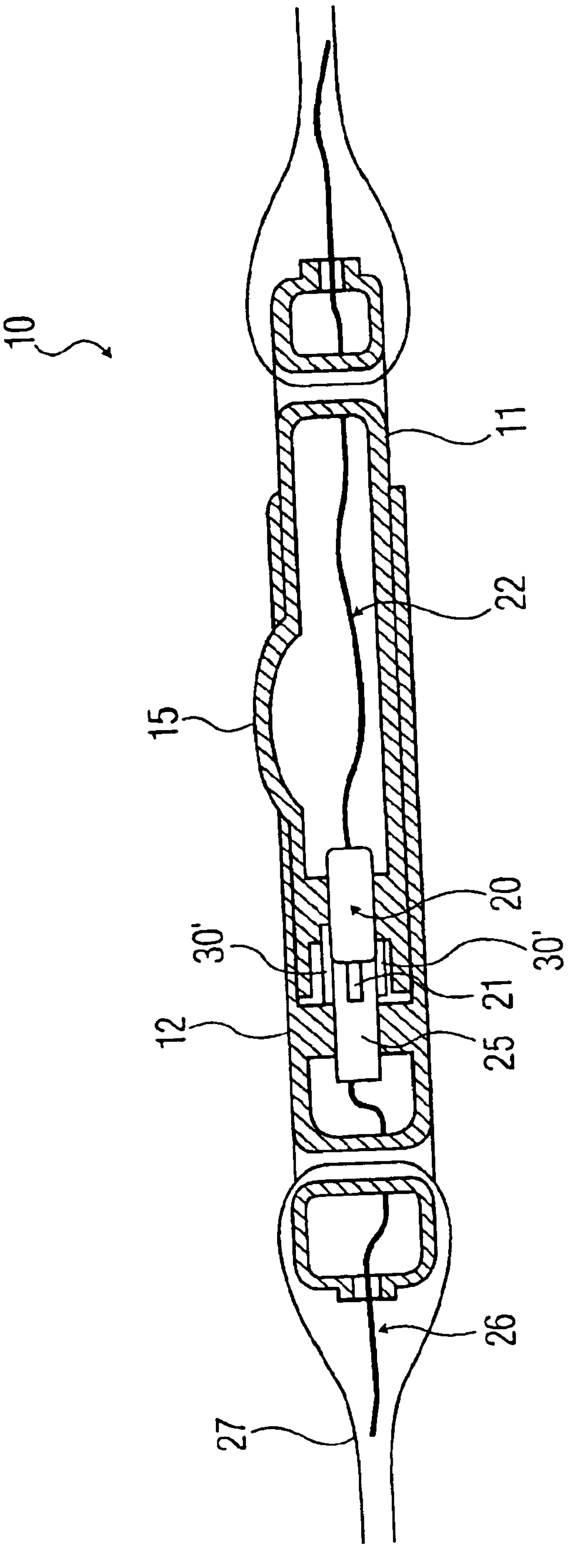
FIG. 2 depicts a side view of the quick-release buckle in FIG. 1 upon connection.

FIG. 1 illustrates a preferred embodiment of the proposed buckle. In this embodiment, buckle 10 includes two portions. First protective housing 11 inserts into second protective housing 12 as shown in FIG. 2. First protective housing 11 includes a flexible depression bump 15 that depresses when it comes into contact with second protective housing 12 during insertion. Flexible depression bump 15 depresses such that first protective housing means 11 can be easily inserted into second protective housing means 12.

Flexible depression bump 15 returns to approximately its original position when first protective housing is inserted into second protective housing 12 and flexible depression bump 15 is aligned with opening 16. As shown in FIG. 2, flexible depression bump 15 forms a friction coupling when it returns to approximately its original position. To decouple the buckle, a user simple depresses flexible depression bump 15 and slides first protective housing 11 out of second protective housing 12. Flexible depression bump 15 further returns to approximately its original position once substantially removed from second protective housing 12.

This embodiment of a quick-release buckle is utilized for illustrative purposes only. Quick-release buckles can include one or more flexible depression elements and openings, or no flexible portions at all, but rather any known means for forming a friction coupling. Examples of other known means for forming a friction coupling include a snapping mechanism, clasping mechanism, or any other known buckling mechanism.

First protective housing 11 and second protective housing 12 can be made from any type of material. As an example, they can be formed from a rigid plastic material or any other material used to form a buckle.

First protective housing 11 also includes multiple pin electrical connector 20 which includes pins 21. Multiple pin electrical connector 20 is attached to cable 22. Cable 22 is electrically conductive and is connected to webbing 23. Webbing 23 can be connected to a garment (i.e., a jacket or shirt), a garment accessory (i.e., a backpack or a belt), or directly to a removable electrical device (i.e., an MP3 player or a mobile phone). Webbing 23 can include conductive fibers, or any other known material that allows it to conduct electrical current (i.e., conductive ink). First protective housing means also serves to protect multiple pin electrical connector 20 and cable 22 from impacts and other detrimental effects that impact electrical connector 20 and cable 22, such as dirt and dust. In addition, cable 22 is not taught and does not become taught within the first protective housing 11, thus improving its stability.

Second protective housing 12 includes an electrical socket 25 that is capable of receiving pins 21 of multiple pin connector 20 to form an electrical connection. Electrical socket 25 is attached to cable 26. Cable 26 is electrically conductive and is connected to webbing 27. Webbing 27 can be connected to a garment (i.e., a jacket or shirt), a garment accessory (i.e., a backpack or a belt), or directly to a removable electrical device (i.e., an MP3 player or a mobile phone). Webbing 27 can include conductive fibers, or any other known material that allows it to conduct electrical current (i.e., conductive ink). Second protective housing 12 protects electrical socket 25 and cable 26 from impacts and other effects which negatively impact electrical socket 25, such as dirt and dust. In addition, cable 26 is not taught and does not become taught within the first protective housing 11, thus improving its stability.

Electrical socket 25 includes a sealing device 30, which protects electrical socket 25 from dust, dirt, water, and any other material which can adversely affect its conductivity. Sealing device 30,30' is spring-mounted. Upon insert of first protective housing means 11 into second protective housing means, sealing device 30,30' opens at point 31 to allow pins 21 to enter electrical socket 25. This occurs by the ends of first protective housing means 11 mechanically pushing open sealing device 30,30' as it is inserted. The insertion of first protective housing 11 into second protective housing means 12 such that flexible depression bump 15 forms a friction coupling when it returns to approximately its original position within opening 16, mechanically secures an electrical connection between pins 21 and electrical socket 25. Further, sealing device 30,30' is opened to the extend that it serves to protect the electrical connection of pins 20 and electrical socket 25 from dust, dirt, water, and any other material which can adversely affect its conductivity, as shown in FIG. 2.

This embodiment of a sealing device is utilized for illustrative purposes only. Sealing devices can include one or more moveable elements and openings, or no flexible portions at all, but rather any known means for forming a sealing device. Examples of other known means for forming a seal include an extendable portion covering electrical socket 25, or any other known sealing mechanism.

Figure 3:
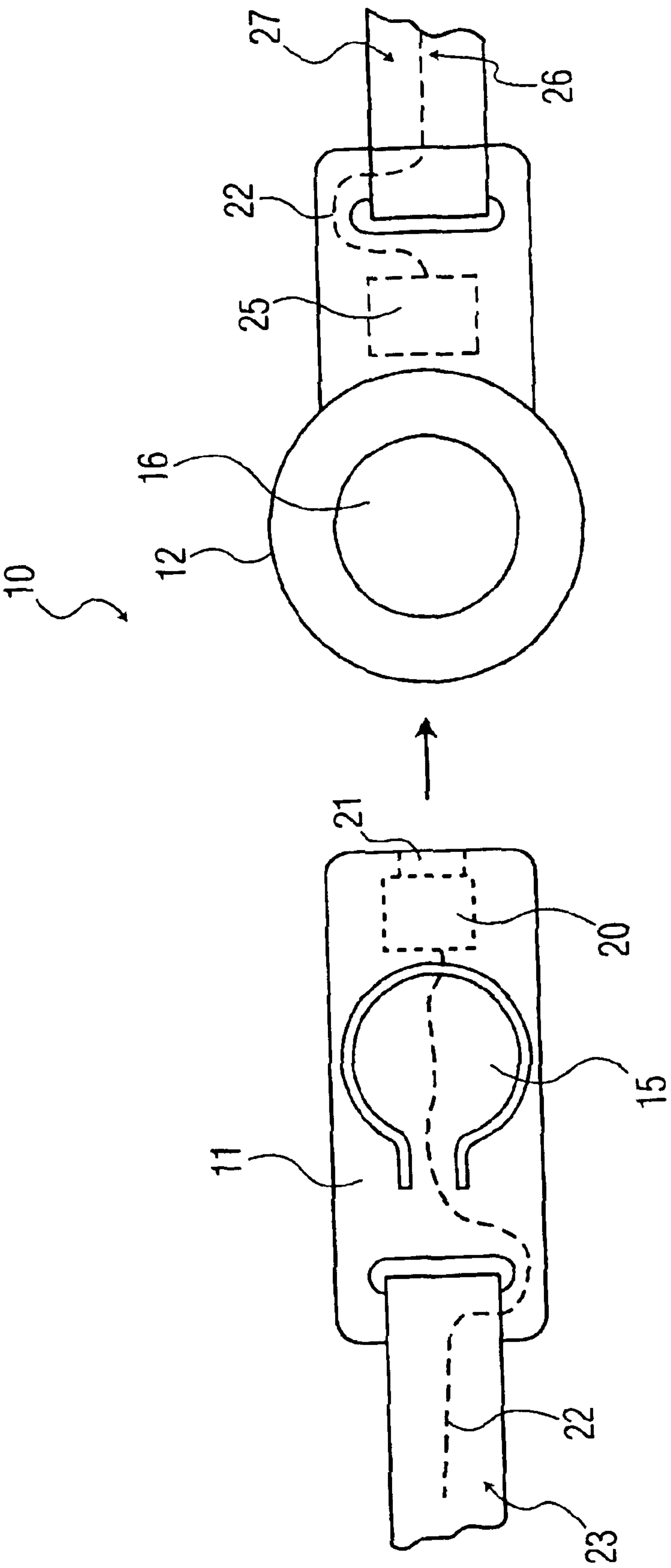
FIG. 3 depicts a top view of the quick-release buckle connector of FIG. 1.

FIG. 3 includes a top view of the quick release buckle shown in FIGS. 1 and 2.

The preceding expressions and examples are exemplary and are not intended to limit the scope of the claims that follow.

What is claimed is:

1. A buckle for securing both an electrical connection and a mechanical coupling comprising:

- a multiple pin male portion of an electrical connector;
- means for receiving the male portion of an electrical connector to form an electrical connection;
- a first protective housing containing one of the multiple pin male portion and the means for receiving the multiple pin male portion and capable of insertion;
- a second protective housing containing one of the means for receiving the male portion and the multiple pin male portion, said second protective housing being capable of receiving the first protective housing to form a mechanical coupling;
- wherein the first and second protective housings include at least one quick-release mechanism for fastening and decoupling the buckle, and wherein the first and second protective housings are connected to a webbing comprising an integrated electrically conducting material.

2. The buckle of claim 1, wherein the mechanical coupling further comprises at least one flexible portion of one of the first and second protective housings which depresses upon insertion and substantially returns to its original position upon alignment with at least one opening in the other of the first and second protective housings, wherein said flexible portion and said opening generate said coupling.

3. The buckle of claim 1, wherein the first and second protective housings further comprise a sealing means for forming a protective seal around the multiple pin male portion and the means for receiving the multiple pin male portion when connected.

4. The buckle of claim 1, wherein at least one of the first and second protective housings further comprise a sealing means for forming a protective seal around at least one of the multiple pin male portion and the means for receiving the multiple pin male portion when not connected.

5. The buckle of claim 4, wherein the sealing means can be displaced such that the multiple pin male portion and the means for receiving the multiple pin male portion can form an electrical connection upon insertion.

6. The buckle claim 5, wherein the of the sealing means can be displaced such that it forms a protective seal around the multiple pin male portion and the means for receiving the multiple pin male portion when connected.

7. The buckle of claim 1, wherein at least one of the first and second protective housings is attached to a garment.

8. The buckle of claim 7, wherein at least one of the multiple pin male portion and the means for receiving the male portion is electrically connected to the garment.

9. The buckle of claim 1, wherein at least one of the first and second protective housings is attached to an electrical device.

10. The buckle of claim 9, wherein at least one of the multiple pin male portion and the means for receiving the male portion is electrically connected to the electrical device.

* * * * *